United States Patent

[11] 3,548,861

| [72] | Inventor | John W. Mullins<br>P.O. Box 20524, Oklahoma City, Okla. 73120 |
|---|---|---|
| [21] | Appl. No. | 825,901 |
| [22] | Filed | May 19, 1969 |
| [45] | Patented | Dec. 22, 1970<br>Continuation-in-part of application Ser. No. 592,104, Nov. 4, 1966, now Patent No. 3,448,758. |

[54] LINE TAPPING SERVICE VALVE
3 Claims, 2 Drawing Figs.

[52] U.S. Cl. ................................................ 137/318
[51] Int. Cl. ........................................... F16k 43/00
[50] Field of Search .................................... 137/315, 317, 318, 627; 77/37—42; 285/197, 198, 199

[56] References Cited
UNITED STATES PATENTS

| 2,414,911 | 1/1947 | Temple | 137/318X |
| 2,827,913 | 3/1958 | Wagner | 137/318 |
| 3,428,075 | 2/1969 | Wagner | 137/318 |
| 3,448,758 | 6/1969 | Mullins | 137/318 |

*Primary Examiner*—Alan Cohan
*Assistant Examiner*—David R. Matthews
*Attorney*—Robert K. Rhea ABSTRACT: A generally cylindrical centrally bored and counterbored housing having lateral ports and external threads intermediate its ends is connected at one end to a line to be tapped. A cylindrical core, having a length slightly greater than the length of the housing and having a line piercing tip, is coaxially received by and sealed with the free end portion of the housing. The inward end portion of the core is provided with a diametric bore intersected by an axial bore extending inwardly from the line piercing tip for communication between the pierced line and the ports.

PATENTED DEC 22 1970    3,548,861

JOHN W. MULLINS
*INVENTOR*

BY

*Robert K. Rhea*
AGENT

LINE TAPPING SERVICE VALVE

CROSS REFERENCE TO RELATED APPLICATION

The present invention is a continuation-in-part of my copending application for Refrigerant Service Valve, filed Nov. 4, 1966, Ser. No. 592,104 now U.S. Pat. No. 3,448,758.

BACKGROUND OF THE INVENTION

1. Field of the Invention

The present invention relates to service values for refrigerant lines and more particularly to a self-tapping valve for providing communication with the gas in a refrigerant line during operation of a refrigerating system.

Many sealed refrigerating systems are not provided with service valves on the high or low pressure refrigerant conductor line. It is highly desirable to provide a means for ascertaining the amount of refrigerant or lack of it contained by the system or to determine on which side of the compressor the trouble lies without disassembling the components.

This is accomplished in the present invention by providing a valve housing having an axial bore and at least one outlet valve closed lateral port wherein the housing may be connected with a refrigerant line and a core forced into the line through the bore for providing communication between the refrigerant line, the bore of the housing and the valve connected with the lateral port.

2. Description of the Prior Art

This invention is distinctive over my above referred to application by providing a substantially solid core having an axially bored line tapping inner end portion which provides communication with the bore of its line connected end portion of its supporting housing. The other end of the core seals with and closes the free end portion of the housing.

Imperforate line piercing cores are shown by U.S. Pat. Nos. 2,875,777 and 3,038,490 wherein the line piercing core, after piercing the line, must be moved partially out of the line to provide communication between the line and core supporting housing. The core is moved back toward and into the line for sealing with seats to interrupt communication with the line whereas, my line piercing core remains in a fixed position, sealed with its supporting housing and is in fluid communication with the pierced line at all times.

U.S. Pat. No. 3,162,211 discloses a line piercing core having a transverse and axial bore in one end portion coaxially fixed in a cap which is threadedly engaged with a line clamping means but this patent similarly requires loosening and tightening the cap to move the core toward and away from a sealing seat formed on the tapped line. My invention, on the other hand, provides a housing which is permanently connected with the line to be tapped and wherein my line piercing core is simultaneously sealed and seated with its supporting housing and provides continuous communication of refrigerant gas through my line piercing core, its supporting housing and one or more lateral ports of the core supporting housing which are preferably opened and closed by air core equipped valves.

SUMMARY OF THE INVENTION

A generally cylindrical centrally bored and counterbored housing having threads intermediate its ends has one end adapted to be connected to a line to be tapped and a thin wall formed at its opposite end. A cylindrical core is closely recieved by the counterbored end of the housing and seats on a housing shoulder formed by the counterbore. The other end portion of the core is diametrically reduced and loosely received by the bore of the housing and projects therebeyond terminating in a beveled line cutting end portion. The small end portion of the core is tranversely bored intermediate its ends and intersected by an axial bore extending inwardly from its beveled end. A cap, threadedly engaged with the housing, forces the core into the line and crimps the thin wall of the housing over the outwardly disposed end of the core. Lateral ports, formed in the housing communicating with its bore around the reduced end portion of the core, are connected with air core equipped valves for communication, in turn with a refrigerant line or pressure gauge.

The principal object of the present invention is to provide a line tapping service valve including a self-tapping core which is forced into the line by a housing cap and seals with the housing to provide continuous communication with the line to be tapped through valve equipped lateral ports in the housing.

DESCRIPTION OF THE PREFERRED EMBODIMENTS

Figure 1:
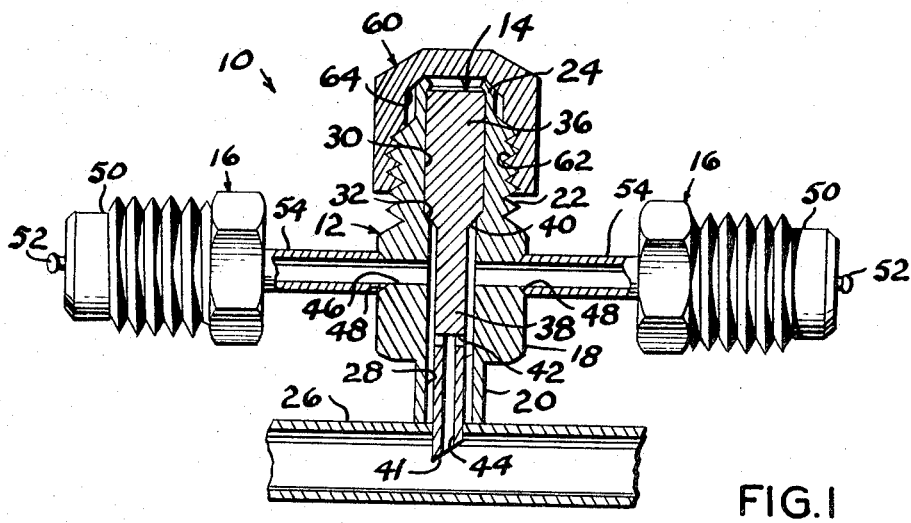
FIG. 1 is a vertical cross-sectional view of the service valve connected with a fragment of a refrigerant line and illustrating, in elevation, a pair of air core equipped valve housings communicating with the refrigerant line.

Like character of reference designate like parts in those figures of the drawings in which they occur.

In the drawings:

The reference numeral 10 indicates the device, as a whole, comprising a housing 12, a line tapping core 14 and outlet valves 16. The housing 12 may be formed of brass or other suitable material generally cylindrical in configuration having a hexagonal intermediate portion or body 18 and a diametrically reduced end portion 20. External threads 22 are formed on the housing adjacent the body 18 and opposite the reduced end portion 20 and defining a thin wall portion 24, outwardly of the threads, opposite the reduced end portion 20. The free end of the diametrically reduced end portion 20 is secured to a line to be tapped 26 as by soldering, not shown. The housing 12 is axially bored, as at 28, and counterbored, as at 30, to form an annular shoulder 32 spaced inwardly from its free end substantially equidistant with the juncture of the threads with the body 18.

The core 14 is provided with a cylindrical end portion 36 which is closely received by the counterbore 30. The length of the core portion 36 is slightly less than the spacing between the housing shoulder 32 and the free end of its thin wall 24. The other end portion of the core is diametrically reduced, as at 38, to form an annular seat 40 for sealing with the housing seat 32. The length of the smaller end portion 38 is such that it projects beyond the line connected housing end portion 20 into the line 26 in the manner hereinafter explained. The line contacting end surface of the smaller end of the core is beveled, as at 41, to form an ovate-shaped line cutting tip. Diametrically the smaller end portion 38 of the core is substantially less than the diameter of the housing bore 28. The smaller end portion 38 of the core is provided with a diametric bore 42 intermediate its ends which is intersected by an axial bore 44 extending inwardly from the beveled end 41 of the core.

The housing 12 is further provided with a diametric bore 46 projecting through opposing flats of its hexagon shaped body 18 thus forming opposing ports 48 communicating with its bore 28.

The outlet valves 16 are preferably of the type described by my U.S. Pat. No. 3,336,936 generally comprising a substantially cylindrical housing 50 which is centrally bored and counterbored to provide a seat which receives and seals with an air core 52 threadedly engaged within one end while the opposite end portion of the housing 50 is diametrically reduced to form a tube 54 having its free end secured, as by soldering, to the housing 12 around the respective port 48 thus providing means for adding refrigerant gas to the line 26 or removing refrigerant gas as well as connecting a pressure gauge, not shown, to one of the valves 16 when desired. Alternatively the housing 12 may be provided with only one port 48 for domestic refrigerating installations.

A cap 60 completes the installation of the device 10. The cap 60 is substantially conventional having a hexagonal exterior and internal threads 62 and is provided at the inner end of its bore with a beveled surface 64 for the purposes presently explained.

Figure 2:
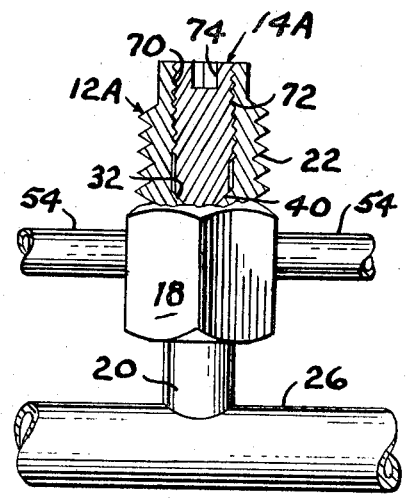
FIG. 2 is a fragmentary elevational view, partially in section of an alternative embodiment.

Referring more particularly to FIG. 2 an alternative embodiment of the housing is illustrated at 12A which is substantially identical with respect to the housing 12 except that its counterbore is provided with internal threads 70 extending inwardly from its free end. A modified form of the core 14A is provided with similar external threads 72 for progressive engagement with the housing threads 70. The outwardly disposed end of the core 14A is provided with a hexagonal wrench receiving socket 74 for rotating the core.

OPERATION

In operation the housing 12 has the valves 16 secured thereto as a subassembly. The housing end portion 20 is secured to the line 26 as described hereinabove. The core 14 is then manually placed in the housing 12 beveled end inwardly. The cap 60 is engaged with the housing threads 22 and with a backup wrench, not shown, placed on the housing body 18 the cap 60 is threadedly engaged progressively with the housing threads 22 by another wrench, not shown. As the cap progressively moves the core 14 toward and into the line 26 to pierce the latter the core seat 40 seals with the housing seat 32 while simultaneously the beveled surface 64 of the cap contacts the free end of the housing wall 24 and crimps the latter inwardly over the outwardly disposed end of the core 34 to lock the core in place. Refrigerant gas in the line 26 then communicates with the respective outlet valve 16 through the core bores 42 and 44 and housing bores 28 and 46.

Operation of the alternative embodiment is similar to that described hereinabove for the device 10 with the exception that the core 14A is threadedly engaged with the housing threads 70 by means of a wrench, not shown, engaged with the wrench socket 74 so that the threads 70—72 hold the core in place after the line 26 has been pierced and the core seated on the housing seat 32.

Obviously the invention is susceptible to changes or alterations without defeating its practicability, therefore, I do not wish to be confined to the preferred embodiment shown in the drawings and described herein.

I claim:

1. A self-tapping service valve for a tubular line, comprising:
 a generally cylindrical centrally bored housing having external threads intermediate its ends;
  said housing having one end surface secured to a line to be tapped,
  said housing having a counterbore extending inwardly from its end opposite its line connected end forming an annular shoulder intermediate its ends and forming a relatively thin wall at its free end portion,
  said housing having at least one lateral port communicating with the housing bore between said annular shoulder and its line connected end;
 tubular means connected with the lateral port;
 a cylindrical core, having a length slightly greater than the length of said housing;
  said core being closely received by the counterbore of said housing,
  said core having a diametrically reduced end portion extending loosely through said housing from said annular shoulder toward and beyond the line connected end of said housing and terminating in a beveled end surface forming an ovate surfaced line penetrating tip,
  said core having an axial bore extending inwardly from its beveled end surface and intersected by a diametric bore intermediate the ends of its diametrically reduced end portion; and
 a cap engaging the threads on said housing;
  said cap having a beveled inner end surface contacting the adjacent outwardly disposed end surface of said core and forcing the penetrating end surface of said core into a line to be tapped and subsequently contacting the outer end surface of said relatively thin wall of said housing and forcing the latter inwardly against and over the adjacent end surface of said core in overlapping locking relation as said cap is progressively engaged threadedly with said housing.

2. Structure as specified in claim 1 in which said tubular means includes a centrally bored air valve equipped housing.

3. Structure as specified in claim 2 in which the counterbore of said housing is threaded.